United States Patent [19]
Wober et al.

[11] Patent Number: 5,475,769
[45] Date of Patent: Dec. 12, 1995

[54] METHOD AND APPARATUS FOR RECOVERING IMAGE DATA THROUGH THE USE OF A COLOR TEST PATTERN

[75] Inventors: Munib A. Wober, Haverhill; F. Richard Soini, Sudbury, both of Mass.

[73] Assignee: Polaroid Corporation, Cambridge, Mass.

[21] Appl. No.: 297,327

[22] Filed: Aug. 29, 1994

Related U.S. Application Data

[63] Continuation of Ser. No. 912,279, Jul. 13, 1992, abandoned.

[51] Int. Cl.$^6$ .................................................. H04N 9/64
[52] U.S. Cl. ........................................ 382/167; 348/242
[58] Field of Search ............................ 382/167; 348/242

[56] References Cited

U.S. PATENT DOCUMENTS

| | | | |
|---|---|---|---|
| 4,237,475 | 12/1980 | Sekiguchi | 358/41 |
| 4,642,678 | 2/1987 | Cok | 358/43 |
| 4,663,661 | 5/1987 | Weldy et al. | 358/43 |
| 4,709,259 | 11/1987 | Suzuki | 358/44 |
| 4,716,455 | 12/1987 | Ozawa | 358/44 |
| 4,774,565 | 9/1988 | Freeman | 358/41 |
| 4,980,759 | 12/1990 | Smyth | 358/44 |
| 5,040,064 | 8/1991 | Cok | 358/44 |
| 5,138,699 | 8/1992 | Minor et al. | 395/131 |

*Primary Examiner*—Stephen Chin
*Assistant Examiner*—Timothy J. May
*Attorney, Agent, or Firm*—Robert A. Sabourin; Edward S. Roman

[57] ABSTRACT

A method and apparatus are presented for processing a set of image data points representing an image and being detected by a detector array having array elements wherein each array element is responsive to only one of a first or a second color. The method includes the steps of generating a color test pattern; detecting actual output responses for at least one neighborhood of detector array elements corresponding to pixels in the color test pattern, where each neighborhood has a given array element responsive to the first color; measuring the response to the color test pattern of the second color of the given array element of each neighborhood of array elements, that is responsive to the first color, to determine the actual color content in the color test pattern that is responsible for the actual output response of the given array element; determining a set of weighting values which relate the actual color contents of the test pattern with the actual output responses to the test pattern; storing the set of weighting values; detecting actual output responses for a subject image for each neighborhood; and determining actual color contents, responsive to the second color for the given array element of each neighborhood corresponding to pixels in the subject image, which actual color contents of the subject image are related to the actual output responses of the subject image by the stored weighting values.

21 Claims, 4 Drawing Sheets

METHOD AND APPARATUS FOR RECOVERING IMAGE DATA THROUGH THE USE OF A COLOR TEST PATTERN

This application is a continuation of U.S. patent application No. 07/912,279 filed 13 Jul. 1992, now abandoned.

BACKGROUND OF THE INVENTION

This invention relates to a method and apparatus for recovering or interpolating image information. In particular, the invention pertains to a method and apparatus for estimating the true color of each pixel of an image acquired by a detector with an arbitrary repeating pattern of detectors having different spectral sensitivities. The invention also relates to a method and apparatus for evaluating various detector configurations and for calibrating the response of such detectors.

Figure 1:
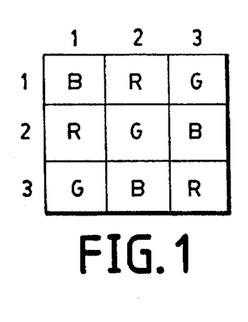
FIG. 1 is a simplified diagram of a known CCD detector having an array of individual detector elements arranged in a spectrally selective mosaic.

In an imaging system employing a detector array having individual detector elements defining pixels, it is necessary to divide the detector into different wavelength response bands. This is achieved by rendering selected pixels sensitive to different wavelengths by means of filter elements. Typically, this is conventionally accomplished by locating the various filter elements over selected pixels in a pattern. The resulting structure, shown in FIG. 1, reveals a detector 10 having an active area divided into an array of individual detectors 12 each of which has a filter of a selected bandwidth over it. In the example illustrated in FIG. 1, three filters 14, 16 and 18 having band widths corresponding, for example, to red (R), green (G) and blue (B), respectively, are disposed over selected detectors 12 in an arbitrary pattern. In the example, the pattern is a repeating pattern of RGB in each row: RGBRGB . . . and in each column: RGBRGB . . . but offset one pixel per row as shown.

Unfortunately, filtering each detector for a selected bandwidth results in lost information at each pixel in the nonselected bands, i.e. the red filter 14 eliminates the green and blue information for the detector 12 with which it is associated. Thus, the information is lost. The same is true for the respective green and blue filters 16 and 18 with respect to the other bands.

It is desirable to recover the lost information so that the image to be detected is as close as possible to the real image scene.

It is not a simple matter to recover the lost data or to calibrate or to predict the true color content of a filtered detector. In addition, known recovery methods do not allow for the ready manipulation of detector patterns for different applications nor are they optimal in terms of minimizing the RMS error between the received image and the actual scene.

Accordingly, a method and apparatus for optimally recovering or interpolating missing image data in a detector array is desirable. It is also desirable to be able to evaluate different detector patterns. In accordance with the invention, computation of recovery coefficients is equivalent to calibration of the detector and the mosaic.

SUMMARY OF THE INVENTION

The invention eliminates and obviates the disadvantages and shortcomings of the described prior arrangements. In a particular embodiment, the invention comprises a method for recovering, interpolating or estimating the true color of each pixel of an image acquired by a detector having an array of detector elements and an arbitrary pattern of individual color filters overlying selected detector elements forming a mosaic pattern. The individual detector elements each have a selected spectral sensitivity determined in accordance with the corresponding color filter. In the method, the mosaic pattern is simulated by acquiring pixel responses from a complete array of broadband detector elements viewing a test image. The test image is color filtered for each of a plurality of individual bands. The response for each pixel in the broadband detector is selected so as to be correlated with the response of the corresponding detector in the mosaic pattern. The method further comprises defining a movable neighborhood of pixels about selected center pixels in the mosaic pattern. Each pixel in the neighborhood is weighted for each color sensitivity relative to the center pixel. Missing values for each center pixel are estimated by averaging the weighted pixels in each neighborhood for each color band.

The invention further comprises determining the response of individual pixels in the mosaic pattern, defining a neighborhood for each of a plurality of selected pixels in the mosaic pattern, and determining a set of weighting values corresponding to the pixels in each neighborhood. The neighborhood data and the pixel data are arranged in a matrix and vector expression, having the form:

$$A*W=X$$

where A is a the matrix of neighborhood values,

X is a vector representing color component values in a particular wavelength of the center pixel, and X is a vector of weighting coefficients corresponding to recovery coefficients of the neighborhood pixels of the matrix A. The expression is solved for W using a linear minimum mean square error (LMMSE) solution to determine the weighting coefficients.

DESCRIPTION OF THE INVENTION

Figure 2:
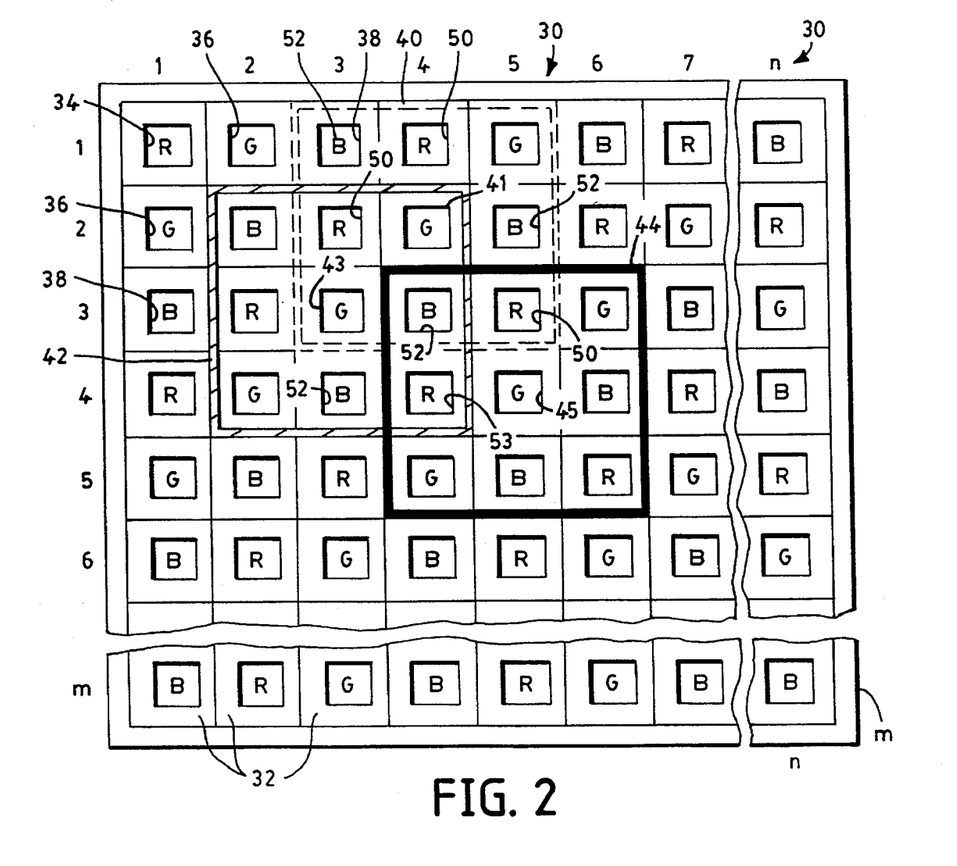
FIG. 2 is an illustration of the CCD mosaic in which selected neighborhoods and corresponding center pixels are illustrated.

FIGS. 2-7 are referred to hereinafter for describing the invention. FIG. 2 illustrates a detector 30 in which individual detector elements are arranged in respective columns and rows in an n by m array. As in FIG. 1, each detector 32 has a designated filter 34, 36 or 38 disposed in overlying relationship as illustrated.

Detector pixel locations are expressed by row (n) and column (m) as (n,m). For example, the detector 32 in the first row and first column (1,1) has an overlying red filter 34 designated by the letter R. The detector in the second row, first column (2,1) has a filter 36 designated by the letter G. The detector in the third row, first column (3,1) has a filter 38 designated by the letter B. Likewise, the detector in the first row, second column (1,2) has a green filter 36 and the detector in the third column, first row (1,3) has a blue filter 38. The repeating pattern R, G and B is the same as set forth above with respect to FIG. 1 and need not be repeated here except to note the enlarged scale.

Each detector 32 (normally a broadband detector) detects and integrates all wavelengths of energy impinging thereon. The filter elements 34, 36 and 38 cause each of the detectors to be selectively responsive only to those wavelengths admitted by the respective filters 34, 36 and 38. As illustrated in FIG. 2, the detectors 30 with the superimposed pattern of corresponding filters 34, 36 and 38 represents a mosaic of pixels which are selectively responsive to those wavelengths corresponding to the filters.

In accordance with the present invention, the exemplary detector array or mosaic 30 illustrated in FIG. 2 may be divided into a plurality of neighborhoods about each of the pixels in each of the wavelengths. For example, FIG. 2 illustrates three arbitrarily selected neighborhoods 40, 42 and 44. The neighborhoods each surround a corresponding green center pixel. As exemplified in FIG. 2, a green center pixel 41 at (2,4) is centrally located in the neighborhood 40. A green center pixel 43 at (3,3) is centrally located in the neighborhood 42. Likewise, the green center pixel 45 at (4,5) is located centrally of the neighborhood 44. For purposes of illustration only, a limited number of neighborhoods is depicted. It should be understood, however, that it is preferred that a neighborhood be defined around each green center pixel, each red center pixel and each blue center pixel in the mosaic.

In accordance with the preferred embodiment of the invention, a neighborhood is defined as a center pixel and each pixel immediately surrounding the center pixel in each adjacent row and column. The neighborhood thus defined is a three by three array of pixels centered on each center pixel (See FIG. 2A). Neighborhood may be referred to as a kernel. For purposes of discussion herein, the pixels around the border, namely in the first and mth row and first and nth column, do not fall at the center of a three by three kernel and are for purposes of this analysis ignored.

It is known that image scenes typically do not change abruptly between adjacent pixel locations. Thus, an adjacent pixel can form the basis for estimating the data missing from the pixel of interest. While the values of the adjacent pixels may not provide an exact determination of the missing information, a reasonable approximation can be made by looking at the neighborhood pixels. Thus, in the present invention, the missing components from each center pixel are determined in accordance with the discernable color information in adjacent pixels within the limited neighborhood.

In order to determine the missing components of each pixel or detector 32 in the array 30 an estimate is made. In the example illustrated in FIG. 2, the green center pixels 41, 43 and 45 are surrounded by pixels responsive to missing bands. For example, the (2,4) green center pixel 41 in neighborhood 40 is immediately adjacent three red pixels 50. Likewise, it can be observed that the green center pixel 41 is immediately adjacent a similar array of blue pixels 52 within the neighborhood 41.

Figure 2A:
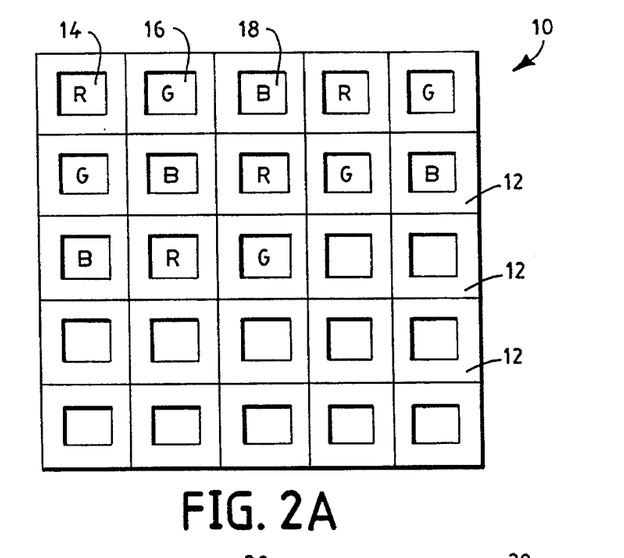
FIG. 2A is a neighborhood separated from the mosaic.

To simplify the explanation, neighborhood 40 may be defined separately from the array as a three by three (3×3) matrix. In FIG. 2A pixel $B_{1,1}$ is the pixel in the upper left hand corner, pixel $R_{1,2}$ is the next adjacent pixel in the one row and pixel $G_{1,3}$ is the green pixel in the top row. The remaining pixels are identified by the filter color and the matrix location.

The missing red component of the green center pixel 41 is proportional to all the available color components of all of the pixels in the three by three neighborhood 40. The missing blue component may be represented in the same way. The green component can simply be equated to the green value of the center pixel 41 or alternatively it could be represented in the same way as noted above. The proportionality constants can be defined as recovery coefficients which are computed as hereinafter discussed. The relationship is set forth in equation 1 below:

$$R_{(2,2)} = [C_{1,1} B_{1,1} + C_{1,2} R_{1,2} + C_{1,3} G_{1,3} + \\ C_{2,1} R_{2,1} + C_{2,2} G_{2,2} + C_{2,3} B_{2,3} + \\ C_{3,1} G_{3,1} + C_{3,2} B_{3,2} + C_{3,3} R_{3,3}] \quad (1)$$

where $R_{(2,2)}$ is the red component of the green center pixel 41 in the neighborhood 40, each C is the recovery coefficient for the red component at the corresponding pixels, and $B_{1,1}$... $R_{3,3}$ are the corresponding pixel values.

Figure 3:
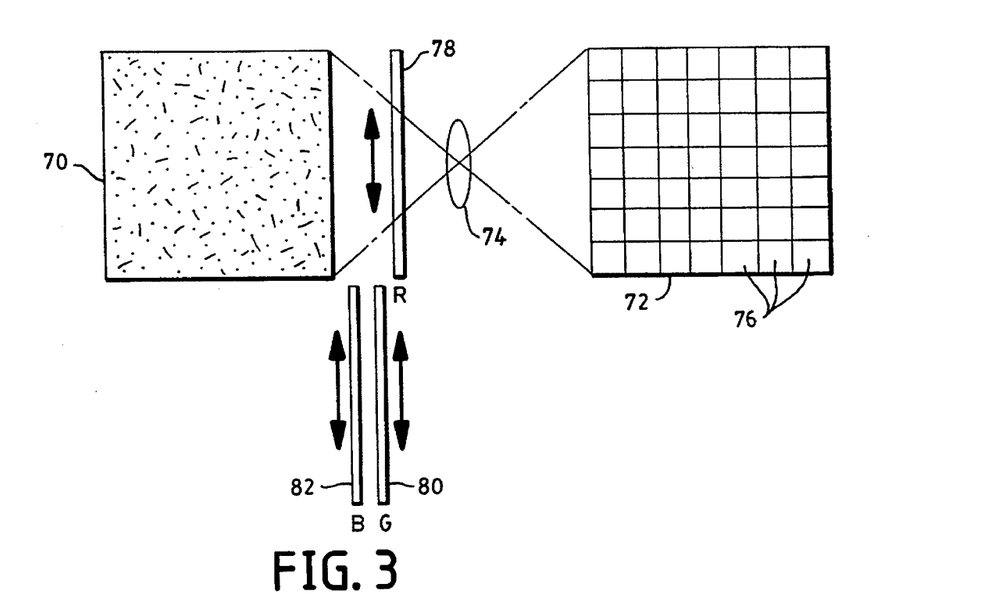
FIG. 3 is an illustration of a broadband CCD adapted to be exposed to an image scene through one or more interchangeable filter elements.

In order to determine what the red component of each of the adjacent pixels is, a spatially and band decorrelated color noise test image 70 is generated (FIG. 3). In the example herein discussed R, G and B components are randomly spread across the test image 70 with R G and B histograms in a flat or white noise spatial power spectrum distribution. For purposes of explanation, the test image 70 represents random color noise. The test image 70 is projected onto a broadband detector array 72 by means of an appropriate lens system 74. The response of each individual detector 76 in the detector array 72 depends upon the light from the corresponding portion of the test image striking the particular detector element.

In accordance with the invention, each of a plurality of filters 78, 80 and 82 is selectively located between the test image 70 and the detector 72. The filter 78, for example, can correspond to the red filters 36 overlying the detectors 32 in the array 30. Filter 80 can be a green filter; and filter 82 can be a blue filter.

The test image 70 is projected onto the detector 72 through the red filter 78 and the output response of the detector array 72 at each detector location 76 represents a red component for that particular detector element. Likewise, the response of the detector array 72 to the test image 70 with the green filter 80 only interposed represents the green component of each of the detector elements 76. Finally the response of the various detector elements 76 to the test image 70 with the blue filter 82 only interposed is obtained. These various responses may respectively be referred to as the red image 90, the green image 92 and the blue image 94.

Figure 4:
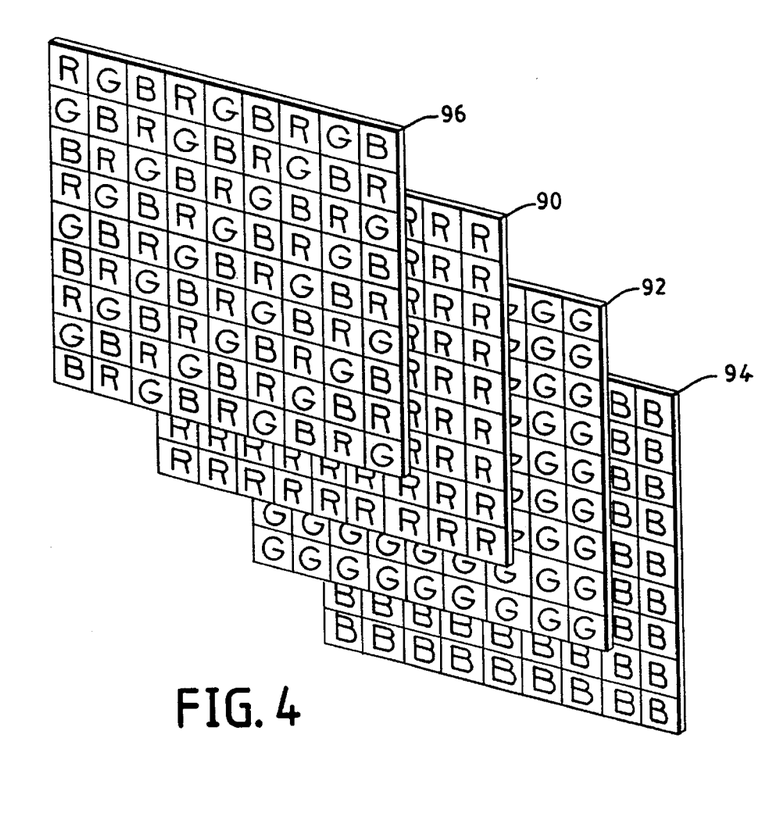
FIG. 4 is an exploded illustration of the mosaic of FIG. 2 superimposed over pixel arrays acquired in accordance with the arrangement of FIG. 3.

A simulated mosaic image 96, i.e. corresponding to the preselected detector array 72, is shown superimposed over the red, green and blue images in FIG. 4. The simulated mosaic 96 represents selected values from the various broadband images 90, 92 and 94 arranged in the same way as the detector mosaic 30 in FIG. 2.

Recovery of the data at each center pixel may be conveniently achieved by means of a matrix algebra solution. The matrix equation for the recovery of data at a center pixel is as follows:

$$A * W = X \quad (2)$$

where A is a matrix neighborhood values;
W is a vector representing weighting coefficients and
X is a vector of color components of a particular wavelength of the center pixels.

In the preferred embodiment for red recovery at a green center pixel, it is desirable to obtain the best set of nine (9) coefficients (3×3) for the neighbors of each green center pixel. From FIGS. 2 and 2A, it is apparent that each green center pixel 41, 43, 45 . . . N has an array of pixels surrounding it in the neighborhood with the same distribution namely $$\begin{array}{ccc} B & R & G \\ R & G & B \\ G & B & R \end{array} \quad (3)$$

Thus, the recovery coefficients representative of the neighbors for the missing value R at center pixel G may be represented as a matrix:

$$\begin{array}{ccc} C^{RG}_{1,1} & C^{RG}_{1,2} & C^{RG}_{1,3} \\ C^{RG}_{2,1} & C^{RG}_{2,2} & C^{RG}_{2,3} \\ C^{RG}_{3,1} & C^{RG}_{3,2} & C^{RG}_{3,3} \end{array} \quad (4)$$

which correspond to the distribution of filters in the mosaic. It should be understood that other distributions may be selected. For purposes of explanation, however, this particular distribution is preferred.

The following is an example of a typical matrix equation for the recovery of R at G center pixels:
From Equation (2):

$$A * W = X$$

method of least squares solution of an over determined set of linear equations may be used. Detailed descriptions of algorithms for performing the above may be found in "Numerical Recipes", pp 52–64 and pp 515–520 by Press et al. (Cambridge University, Press 1986). An implementation by Research Systems, Inc. (Denver) using their IDL language was used to solve the matrix equation (5).

An array of broadband detectors, a lens system and selected color filters can be employed to induce spatial and color correlation to a decorrelated image in the manner of this invention to be subsequently described in greater detail of color filters. The acquired information can then be used to generate coefficients which enable accurate interpolation of the response of a particular array of filters or in an array. By solving for the coefficients of vector W utilizing a so-called linear minimum mean square error (LMMSE) solution, a set of values can be provided for any given mosaic pattern of color filters which can be used to interpolate or recover the missing information. In other words, the missing information is supplied by a calculation using a stored set of values corresponding to a selected mosaic, and acquired values of a test image.

Figure 5:
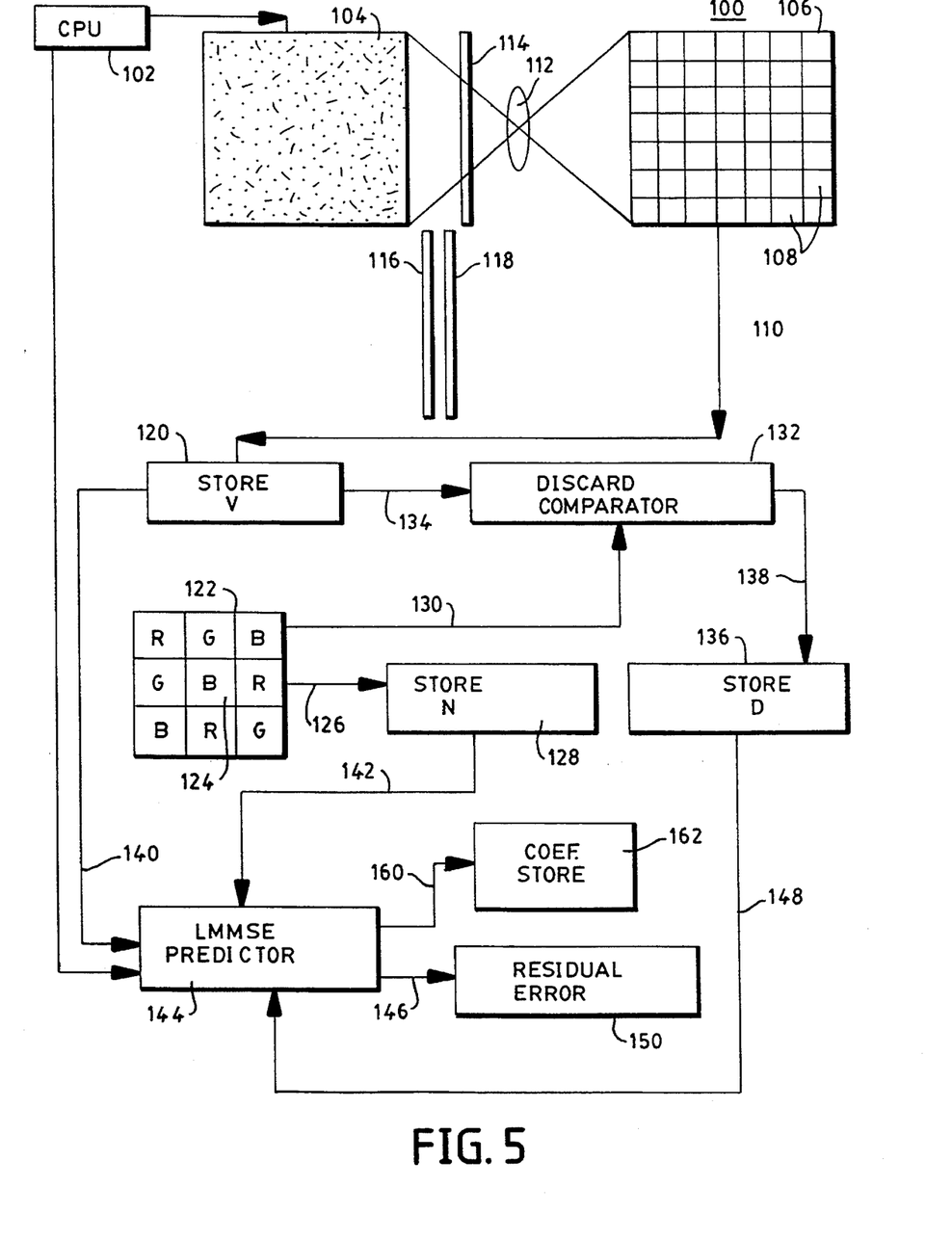
FIG. 5 is a schematic block diagram of an apparatus for performing the method of the present invention.

FIG. 5 illustrates an apparatus for accomplishing the method of the present invention. The apparatus 100 includes a CPU 102 for generating a color noise test image 104. A broadband detector array 106 formed of a plurality of individual detectors 108 is responsive to the test image 104 to produce an output on line 110. The test image 104 is projected onto the detector 106 by means of an appropriate lens system 112 and each of a plurality of filters 114, 116 and 118 is selectively interposed such that the detector 106 is responsive to produce outputs in each of the color bands represented by the filters 114, 116 and 118. The data or values V in each of the color bands acquired by the detector 106 is coupled on line 110 to a storage device Store V 120.

A color filter mosaic pattern 122 is selected for a camera detector array where the pattern will be arranged in the respective fashion to define adjacent neighborhoods each having a center pixel 124. The arrangement of the color filters within the mosaic pattern is coupled via line 126 to a matrix storage device Store N 128. Data concerning the $$
\begin{array}{l}
41 \\
43 \\
45 \\
\phantom{41} \\
\phantom{41} \\
\phantom{41} \\
\phantom{41} \\
\phantom{41} \\
N
\end{array}
\begin{array}{l}
\{B_{1,1} \; R_{1,2} \; G_{1,3}, \; R_{2,1} \; G_{2,2} \; B_{2,3}, \; R_{3,1} \; G_{3,2} \; B_{3,3}\} \\
\{B_{1,1} \; R_{1,2} \; G_{1,3}, \; R_{2,1} \; G_{2,2} \; B_{2,3}, \; R_{3,1} \; G_{3,2} \; B_{3,1}\} \\
\{B_{1,1} \; R_{1,2} \; G_{1,3}, \; R_{2,1} \; G_{2,2} \; B_{2,3}, \; R_{3,1} \; G_{3,2} \; B_{3,3}\} \\
\{B_{1,1} \; R_{1,2} \; G_{1,3}, \; R_{2,1} \; G_{2,2} \; B_{2,3}, \; G_{3,1} \; B_{3,2} \; R_{3,3}\} \\
\{B_{1,1} \; R_{1,2} \; G_{1,3}, \; R_{2,1} \; G_{2,2} \; B_{2,3}, \; G_{3,1} \; B_{3,2} \; R_{3,3}\} \\
\{B_{1,1} \; R_{1,2} \; G_{1,3}, \; R_{2,1} \; G_{2,2} \; B_{2,3}, \; G_{3,1} \; B_{3,2} \; R_{3,3}\} \\
\{B_{1,1} \; R_{1,2} \; G_{1,3}, \; R_{2,1} \; G_{2,2} \; B_{2,3}, \; G_{3,1} \; B_{3,2} \; R_{3,3}\} \\
\{B_{1,1} \; R_{1,2} \; G_{1,3}, \; R_{2,1} \; G_{2,2} \; B_{2,3}, \; G_{3,1} \; B_{3,2} \; R_{3,3}\} \\
\{B_{1,1} \; R_{1,2} \; G_{1,3}, \; R_{2,1} \; G_{2,2} \; B_{2,3}, \; G_{3,1} \; B_{3,2} \; R_{3,3}\}
\end{array}
\;*\;
\begin{array}{l}
W^{RG}_{1,1} \\
W^{RG}_{1,2} \\
W^{RG}_{1,3} \\
W^{RG}_{2,1} \\
W^{RG}_{2,2} = \\
W^{RG}_{2,3} \\
W^{RG}_{3,1} \\
W^{RG}_{3,2} \\
W^{RG}_{3,3}
\end{array}
\begin{array}{l}
\{R\} \\
\{R\} \\
\{R\} \\
\{R\} \\
\{R\} \\
\{R\} \\
\{R\} \\
\{R\} \\
\{R\}
\end{array}
\begin{array}{l}
41 \\
43 \\
45 \\
\\
\\
\\
\\
\\
N
\end{array}
\quad (5)
$$

It should be understood that the above expressions can be generalized for K colors in any desired array, (e.g. stripes, diagonals, etc.).

In the above equation, the matrix A represents the neighborhood values, the vector W represents the weighting values or the coefficients, and the vector X represents the actual values of the acquired data from the red image 90. The same matrix can be set up for green and blue with appropriate substitutions. The solution to equation (5) above results in a set of weighting coefficients (represented as vector W) which enables the reconstruction of an image detected by the mosaic in each color band.

The solution of the matrix equation (5) is accomplished by known mathematical operations. In particular, the particular arrangement of the color filters in the mosaic pattern namely the distribution of individual filters on each of the detectors is coupled on line 130 to a discard comparator 132. Values in the Store V 120 are coupled to the discard comparator 132 on line 134. The discard comparator 132 reads selected values from Store V into a Store D device 136 over output line 138 by comparing the color filter distribution of pixels in the mosaic pattern 122 with the acquired data in Store V 120. Store D holds pixel data for each color which would otherwise be filtered out by each pixel color filter in the mosaic pattern. For example, any red sensing pixel would filter out or reject green and blue data and so forth.

An output 140 of Store V 120, an output 148 of Store D 136 and an output 142 of matrix Store N 128 are all coupled to an LMMSE predictor 144 or processor. The predictor solves the matrix equation A*W=X, for example, under the supervision of the CPU 102 using the LMMSE solution and produces an output on line 160 which corresponds to the coefficients W which may be associated with each respective pixel in the detector or mosaic pattern 122 for interpolating the data with a minimized error. The output 160 may supply data to a coefficient store 162 for implementation at a later time. The LMMSE predictor 144 also provides on line 146 a residual error signal which is indicative of the accuracy at which the weighting coefficients can be utilized to interpolate values. As will be readily understood, the accuracy of the coefficients to interpolate color values depends on the amount of overlap between the spectral sensitivity ranges of the individual color filter elements in the mosaic pattern as well as the amount of lens blurring and the actual arrangement of the color filters within the mosaic pattern. If the residual error is found to be unacceptable, then any of the aforementioned parameters can be adjusted either alone or in combination to reduce the residual error.

Figure 6:
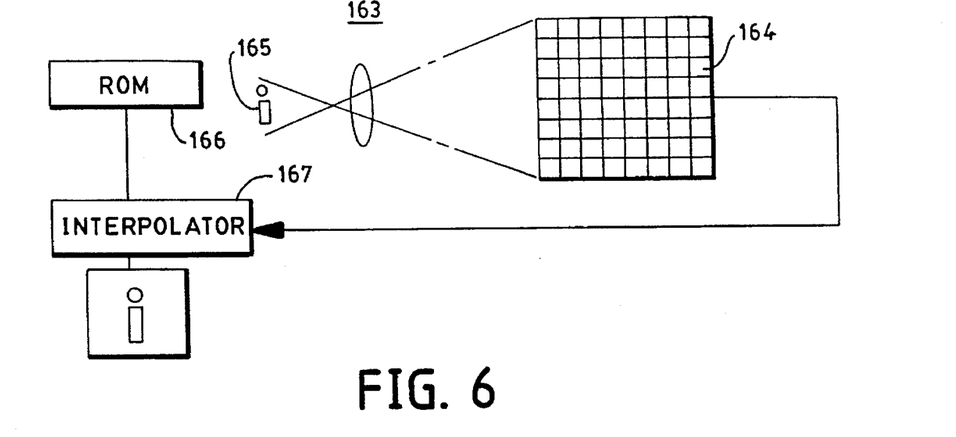
FIG. 6 is a schematic block diagram showing interpolation of an image acquired by a camera having a mosaic detector employing weighting coefficients derived in accordance with the invention.

FIG. 6 illustrates a particular exemplary application of the invention for interpolating or recovering acquired image data in an electronic camera 163 having an image sensing detector array 164 with a color filter mosaic pattern which corresponds to the mosaic 122 in FIG. 5. The detector 164 is responsive to an image scene 165 and produces an image data output corresponding to the acquired image. As will be readily understood, the spectral filter characteristics for the color filter mosaic pattern of the detector 164 are substantially identical to the spectral filter characteristics of the filters 114, 116 and 118 in FIG. 5. The data produced by the apparatus in FIG. 5, namely the weighting coefficients, may be transferred from the coefficient store 162 to a storage device in the camera 163, such as a read only memory (ROM) 166. An interpolator 167 responsively coupled to the detector 164 and the stored weighting coefficient in ROM 166 produce an output image 169 which contains the interpolated image data acquired by the detector 164.

In accordance with the invention, the interpolation process is performed so that full color information may be acquired even though each pixel is only responsive to a limited band within the color spectrum. Accurate interpolation is achieved looking at the response of all the detectors in the neighborhood (the kernel) of each center pixel in the array. Because, there is spatial and color correlation in the captured image resulting from the optical and color filter overlap, a reasonable estimate of the pixel response can be made by looking at the neighboring pixels. The accuracy of the system is enhanced by using a decorrelated noise image as the test image for each of a plurality of controls namely the red, green and blue images. The corresponding response of each individual detector in a detector array to a spatially and color decorrelated noise test image is acquired and saved. A select color filter mosaic pattern for a given pixel array is arranged in neighborhoods. Using the acquired data the response of each pixel in the color filter mosaic pattern is established in accordance with the filter overlying the particular individual detector for that pixel. The acquired data corresponding to the remaining bands is saved and designated as target information. The solution to the matrix equation yields a set of weighting coefficients which will allow the recovery of missing information for each pixel in the mosaic pattern.

Figure 7:
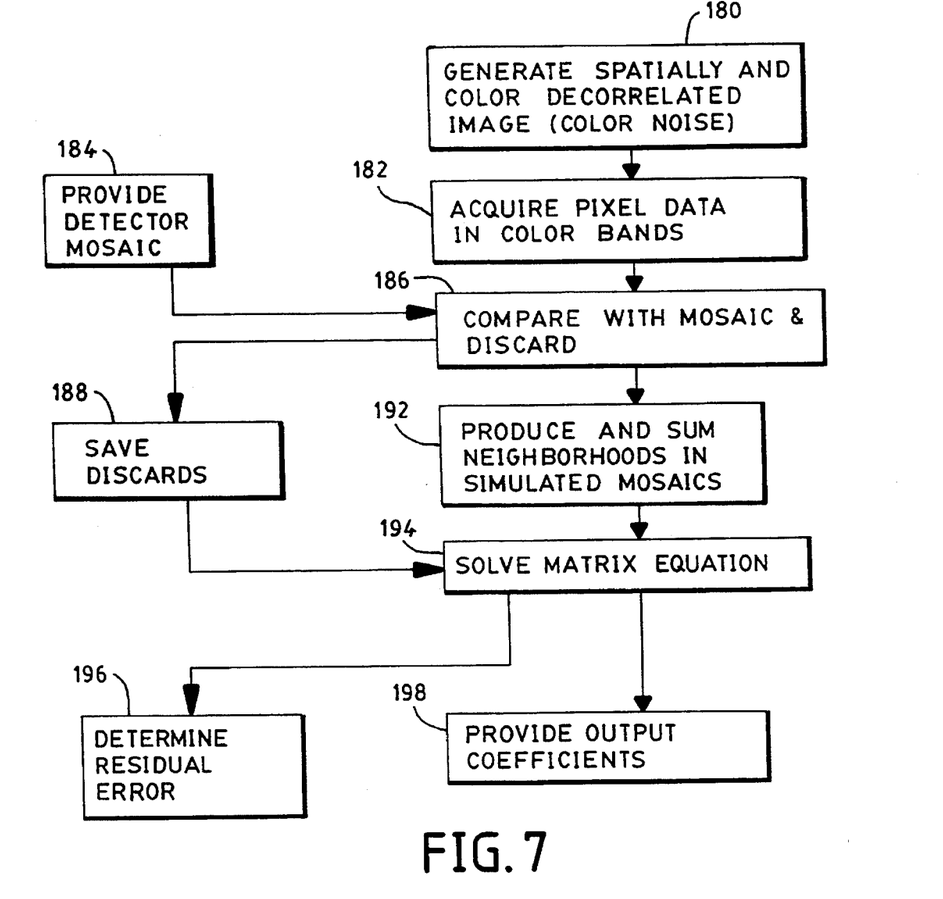
FIG. 7 is a flow chart illustrating the steps in a process implemented in accordance with the present invention.

As shown in FIG. 7, the method of the invention comprises a step 180 of generating a color noise test image 182 and a step 182 of acquiring pixel data 182 for each pixel in an array in response to the filtered, spatially and color decorrelated noise image. In step 184 the acquired pixel data in each of a plurality of wavelength bands is saved and an arbitrary array of pixels each having a selected band limited response provides the color filter mosaic pattern that will ultimately be used in the electronic camera detector array. The acquired pixel data from step 182 and the arrangement of the mosaic pattern provided in step 184 are compared and the values not in the detector mosaic pattern are discarded in step 186. Discards are saved at step 188 and nondiscards provide the values of neighhood pixels. The neighborhood pixel values of each corresponding to the center pixels in the mosaic pattern are summed in step 192 for each component in the plurality of wavelength bands. The matrix equation A*W=X is solved using the discarded data from step 188. The solution to the matrix equation at step 194 using the discarded and acquired neighborhood pixel values provides the weighting coefficients at step 198 and the residual error at step 196. If the residual error turns out to be excessive, then the color filter mosaic pattern can be changed or the spectral ranges for the color filters in the mosaic pattern can be widened to provide more overlap.

The present invention as implemented is therefore effective to allow any mosaic pattern array to be analyzed whereby weighting coefficients may be derived for recovering missing spectral information at each detector location. In addition, analysis of various pixel arrangements (i.e. various mosaics) may be implemented in order to determine which arrangement is best suited for true color reproduction. For example, it has been found that the arrangement illustrated in FIG. 4 with alternate offset primary colors is superior to arrangements in which non-offset or striped filters are used to cross the face of the detector. It should be understood further that although primary colors are discussed, other color combinations known to those skilled in the art may be employed, and any mosaic array or neighborhood shape may be analyzed in accordance with the method and apparatus of the present invention. Further, since the color recovery is effectively a spatial kernel convolution, any linear spatial filtering operation involving a convolution with a kernel no larger than the neighborhood can be combined with the color recovery at no additional computational cost.

While there have been described what at present are considered to be the preferred embodiments of the present invention, it will be readily apparent to those skilled in the art that various changes may be made therein without departing from the invention and it is intended in the claims to cover such changes and modifications as fall within the true spirit and scope of the invention.

What is claimed is:

1. A method for processing a set of image data points representing an image and being detected by a detector array comprising array elements wherein each array element is responsive to only one of a first color and a second color, said method comprising the steps of:

generating a color test pattern comprising said first and second colors;

detecting, with said detector array, first actual output responses for at least one neighborhood of array elements, said neighborhood of array elements being responsive to corresponding pixels in the color test pattern, where each said neighborhood has a given array element responsive to the first color;

measuring the second color of the given array element of each said neighborhood of array elements in the color test pattern to determine a first actual color content related to the given array element;

determining a set of weighting values which relate said determined first actual color contents with the first actual output responses;

storing the set of weighting values;

detecting, with said detector array, second actual output responses of each said neighborhood to a subject image; and determining second actual color contents, responsive to said second color of said given array element of each said neighborhood corresponding to pixels in the subject image, which second actual color contents are related to the second actual output responses by the stored weighting values.

2. The method of claim 1, wherein the color test pattern is a spectrally decorrelated color noise image.

3. The method of claim 1, wherein said neighborhood comprises a center array element and the array elements surrounding and adjacent to the center array element, and wherein the center array element is the given array element.

4. The method of claim 3, wherein the color test pattern is a three color repeating pattern.

5. The method of claim 4, wherein the three color repeating pattern is Red (R), Green (G) and Blue (B).

6. The method of claim 1, wherein said neighborhood comprises a 3×3 array of array elements.

7. The method of claim 1, wherein each said array element is responsive to only one of the first color, the second color and a third color, and wherein said at least one neighborhood is represented as only one of:

| G | B | R |
|---|---|---|
| B | R | G |
| R | G | B | and;

| B | R | G |
|---|---|---|
| R | G | B |
| G | B | R | and;

| R | G | B |
|---|---|---|
| G | B | R |
| B | R | G | and wherein R represents a red color detector, G represents a green color detector and B represents a blue color detector.

8. The method of claim 11, wherein said color test pattern is spectrally blurred.

9. The method of claim 1, wherein said step of determining weighting values further comprises the step of optimizing said weighting values.

10. The method of claim 9, wherein said step of determining weighting values further comprises the step of optimizing said weighting values using a linear minimum mean square error.

11. The method of claim 1, wherein the step of determining a set of weighting values solves the matrix equation $$A*W=X$$

wherein A is a matrix representing said actual output responses, W is a matrix representing said set of weighting values, and X is a matrix representing said actual color contents.

12. An apparatus for processing a set of image data points representing an image, said apparatus comprising:

an image generator for generating a color test pattern comprising a plurality of colors;

a detector array comprising array elements each responsive to a first color of the plurality of colors, said detector array detecting first actual output responses for at least one neighborhood of array elements, said neighborhood of array elements being responsive to corresponding pixels in the color test pattern, where each said neighborhood has a given array element responsive to the first color;

means for measuring a second color of the plurality of colors of the given array element of each said neighborhood of array elements in the color test pattern to determine a first actual color content related to the given array element;

means for determining a set of weighting values which relate said determined first actual color contents with the first actual output responses;

means for storing the set of weighting values;

means for detecting, with said detector array, second actual output responses of each said neighborhood to a subject image; and means for determining second actual color contents, responsive to said second color of said given array element of each said neighborhood corresponding to pixels in the subject image, which second actual color contents are related to the second actual output responses by the stored weighting values.

13. The apparatus of claim 12, wherein the means for determining weighting values solves the matrix equation $$A*W=X$$

wherein A is a matrix representing said actual output responses, W is a matrix representing said set of weighting values, and X is a matrix representing said actual color contents.

14. The apparatus of claim 12, wherein said neighborhood is represented as a 3×3 array of array elements.

15. The apparatus of claim 12, wherein the color test pattern is spectrally decorrelated.

16. The apparatus of claim 12, wherein said color test pattern is spectrally blurred.

17. The apparatus of claim 12, wherein said means for determining weighting values further comprises means for determining optimum weighting values using linear minimum mean square error.

18. The apparatus of claim 12, wherein the color test pattern is a three color repeating pattern.

19. The apparatus of claim 18, wherein the three color repeating pattern is Red (R), Green (G) and Blue (B).

20. The apparatus of claim 12, wherein each said array element is responsive to only one of the first color, the second color and a third color, and wherein said at least one neighborhood is represented as only one of:

```
G  B  R
B  R  G
R  G  B
    and;

B  R  G
R  G  B
G  B  R
    and;
```

```
R  G  B
G  B  R
B  R  G
``` and wherein R represents a red color detector, G represents a green color detector, and B represents a blue color detector.

21. The apparatus of claim 12, wherein said step of determining weighting values further comprises the step of optimizing said weighting values.

* * * * *